US008483300B2

(12) United States Patent
Omidi et al.

(10) Patent No.: US 8,483,300 B2
(45) Date of Patent: Jul. 9, 2013

(54) METHOD AND SYSTEM FOR REDUCING OUT OF BAND RADIATION IN ORTHOGONAL FREQUENCY DIVISION MULTIPLEXING SYSTEMS

(76) Inventors: Mohammad Javad Omidi, Isfahan (IR); Mohammad Mahdi Naghsh, Isfahan (IR)

(*) Notice: Subject to any disclaimer, the term of this patent is extended or adjusted under 35 U.S.C. 154(b) by 289 days.

(21) Appl. No.: 12/913,906

(22) Filed: Oct. 28, 2010

(65) Prior Publication Data

US 2011/0038435 A1    Feb. 17, 2011

Related U.S. Application Data

(60) Provisional application No. 61/345,618, filed on May 18, 2010.

(51) Int. Cl.
*H04K 1/10* (2006.01)
*H04L 27/28* (2006.01)

(52) U.S. Cl.
USPC ............................................. 375/260

(58) Field of Classification Search
USPC .. 375/341, 141, 232, 150, 260, 343; 455/108, 455/63.1, 296
See application file for complete search history.

(56) References Cited

U.S. PATENT DOCUMENTS

| | | | |
|---|---|---|---|
| 7,305,057 B1* | 12/2007 | Miao | 375/350 |
| 7,852,908 B1* | 12/2010 | Norman | 375/150 |
| 2005/0030888 A1* | 2/2005 | Thesling | 370/208 |
| 2007/0211835 A1* | 9/2007 | Inagawa et al. | 375/343 |
| 2010/0027688 A1* | 2/2010 | Suh et al. | 375/260 |

* cited by examiner

*Primary Examiner* — Daniel Washburn
*Assistant Examiner* — Wednel Cadeau
(74) *Attorney, Agent, or Firm* — Barry Choobin; Patent360 LLC (57) ABSTRACT

The various embodiments herein provide a method and system for reducing Out of Band Radiation in Orthogonal Frequency Division Multiplexing (OFDM). The method includes transmitting a plurality of signals with a plurality of modulated symbols on each subcarrier. The method includes introducing a controlled amount of correlation among the consecutive modulated symbols across time. Further the method includes removing the controlled amount of correlation among the plurality of modulated symbols. The method also includes reducing an out of band radiation in OFDM. The system for reducing Out of Band Radiation in Orthogonal Frequency Division Multiplexing (OFDM) includes a transmitter to transmit one or more signals with a plurality of modulated symbols on each subcarrier. The system includes a transmitter with digital filters and a receiver. The receiver includes a Maximum Likelihood Sequence Detector (MLSD) to remove the controlled amount of correlation among the plurality of modulated symbols.

13 Claims, 7 Drawing Sheets

METHOD AND SYSTEM FOR REDUCING OUT OF BAND RADIATION IN ORTHOGONAL FREQUENCY DIVISION MULTIPLEXING SYSTEMS

CROSS-REFERENCE TO RELATED APPLICATIONS

This application claims the benefit of U.S. provisional patent application Ser. No. 61/345,618, filed May 18, 2010, which is incorporated herein by reference in its entirety.

SPONSORSHIP STATEMENT

The present invention is sponsored by Isfahan Science and Technology Town (ISTT).

BACKGROUND

1. Technical Field

The embodiments herein generally relate to communication systems and techniques and particularly relate to multi carrier modulation systems such as Orthogonal Frequency Division Multiplexing (OFDM) type communication system and method. The embodiments herein more particularly relate to a method for reducing out of band (OOB) radiation or components and peak to average power ratio (PARR) in OFDM type communication system and method.

2. Description of the Related Art

Orthogonal frequency division multiplexing (OFDM) is a multicarrier modulation (MCM) technique that has been used in many conventional systems such as wireless local area networks (WLANs), long-term evolution (LTE) systems, digital video broadcast (DVB) and digital audio broadcast. Orthogonal frequency division multiplexing (OFDM) is a robust method for transmitting and receiving data over frequency selective channels.

In the current scenario, the orthogonal frequency division multiplexing (OFDM) is a mature and one of the most popular Multicarrier Modulation (MCM) techniques. Also, it is the main candidate for the physical layer of the Cognitive Radio (CR) networks. CR is a new method to satisfy ubiquitous demand for wireless services while the unlicensed spectrum is not sufficient. However, the most important shortcoming of OFDM-based CR systems is the high level of out of band (OOB) components that originate from simple fast Fourier transform (FFT)-based implementation.

In addition, the demand for ubiquitous wireless services has increased rapidly in the past years. Unfortunately, the vast majority of available spectrum resources have already been licensed and there is only limited bandwidth to set up new services. Further in CR, the unlicensed users are allowed to transmit and receive data over portions of a licensed spectrum, when the licensed users or primary users (PU) are inactive. To sense the inactivity of primary users and detect discontinuous bandwidth between active bands, or spectrum holes, the secondary users (SU) need to sense the spectrum. Because of the discontinuous nature of inactive spectra and the ability of OFDM to utilize such spectrum, OFDM has been the main candidate for the implementation of physical layer of CR networks.

However, the most important drawback of OFDM based CR systems is the large OOB radiation that originates from the high level side-lobes of IFFT modulated subcarriers. These side-lobes cause unwanted interference among secondary users and also between secondary users and primary users. Therefore, the OOB radiation of OFDM has been a considerable issue either in conventional applications or in CR networks.

Several methods are available for OOB radiation reduction in OFDM systems. Further the insertion of guard bands at the borders of OFDM spectrum has been proposed in the existing art. The drawback of this approach is the less effective utilization of the bandwidth.

Hence there is a need to provide a method and system for achieving reduction of Out of Band (OOB) Radiation in Orthogonal Frequency Division Multiplexing (OFDM). There also exists a need to provide an effective method for the reduction of the PAPR and Inter-carrier Interference (ICI). Moreover, there exists a need to provide a method for use in the CR systems for effective utilization of the spectrum.

The abovementioned shortcomings, disadvantages and problems are addressed herein and which will be understood by reading and studying the following specification.

OBJECTIVES OF THE EMBODIMENTS

A primary object of the embodiments herein is to provide a system and method for reducing Out of Band (OOB) Radiation in Orthogonal Frequency Division Multiplexing (OFDM) systems by introducing a controlled amount of correlation between successive symbols of each subcarrier.

Yet another object of the embodiments herein is to provide a system and method for reducing Out of Band (OOB) Radiation in Orthogonal Frequency Division Multiplexing (OFDM) systems by choosing a correlation pattern of each subcarrier individually.

Another object of the embodiments herein is to provide a system and method for reducing Out of Band (OOB) Radiation in Orthogonal Frequency Division Multiplexing (OFDM) systems by selecting a partial response signaling schemes such as a Doubinary scheme for introducing a controlled amount of correlation between successive symbols of each sub carrier.

Yet another object of the embodiments herein is to provide a system and method for reducing Out of Band (OOB) Radiation in Orthogonal Frequency Division Multiplexing (OFDM) systems by using a precoding to compensate for the increase in Word Error Rate (WER).

Yet another object of the embodiments herein is to provide a system and method for reducing Out of Band (OOB) Radiation in Orthogonal Frequency Division Multiplexing (OFDM) systems by using a precoding in Doubinary case with BPSK to simplify a receiver structure thereby eliminating a need for an MLSD detector.

Yet another object of the embodiments herein is to provide a system and method for reducing Out of Band (OOB) Radiation in Orthogonal Frequency Division Multiplexing (OFDM) systems to prevent an increase in Peak to Average Power Ratio (PARR) level.

Yet another object of the embodiments herein is to provide a system and method for reducing Out of Band (OOB) Radiation in Orthogonal Frequency Division Multiplexing (OFDM) systems so that the performance, practical feasibility, and flexibility of the method and system make it a good option for physical layer of Cognitive Radio (CR).

Yet another object of the embodiments herein is to provide a system and method for modulation in the physical layer of multi-user OFDM systems (OFDMA), since in some recent standards such as WiMax or LTE, multiuser access is achieved through OFDMA by dividing subcarriers of an OFDM block among different users.

Yet another object of the embodiments herein is to provide a system and method for the better use of spectrum and less Multiple Access Interference (MAI).

Yet another object of the embodiments herein is to provide a system and method for MAI reduction in an OFDMA system resulting in higher performance in the uplink synchronization at the base station.

Yet another object of the embodiments herein is to provide a system and method for reducing Out of Band (OOB) Radiation in Orthogonal Frequency Division Multiplexing (OFDM) systems to enable the use of several PAPR reduction methods.

These and other objects and advantages of the embodiments herein will become readily apparent from the following detailed description taken in conjunction with the accompanying drawings.

SUMMARY

The various embodiments herein provide a system and method for reducing Out of Band (OOB) Radiation in Orthogonal Frequency Division Multiplexing (OFDM) system. The method includes transmitting a plurality of signals with a plurality of modulated symbols on each subcarrier and introducing a controlled amount of correlation among consecutive modulated symbols across time and hence reducing out of band radiation in OFDM. Further the method includes removing the controlled amount of correlation among the plurality of modulated symbols. The method also includes detecting the plurality of modulated symbols.

According to an embodiment herein, the step of introducing the controlled amount of correlation includes utilizing a carrier-by-carrier controlled signaling induction technique to control the amount of correlation.

According to an embodiment herein, the controlled amount of correlation is introduced based on one or more correlation patterns.

According to an embodiment herein, the one or more correlation patterns are selected based on a plurality of Out of bandwidth (OOB) levels of the plurality of modulated symbols.

According to an embodiment herein, the one or more correlation patterns are assigned to the plurality of modulated symbols on each subcarrier across time.

According to an embodiment herein, the one or more correlation patterns comprise a proper partial signaling scheme.

According to an embodiment herein, the one or more correlation patterns comprise a plurality of convolution coders.

According to an embodiment herein, the proper partial proper signaling scheme comprises a Doubinary scheme and a class 2 Partial Response Signaling (PRS) scheme.

According to an embodiment herein, the plurality of convolution coders comprises (1+D, 1-2D+D2) as code.

According to an embodiment herein, the controlled amount of correlation is removed using a viterbi algorithm.

According to an embodiment herein, reduction of the Out of bandwidth (OOB) levels includes a plurality of Out of bandwidth (OOB) suppression algorithms.

According to an embodiment herein, the plurality of Out of bandwidth (OOB) suppression algorithms includes at least one of a time windowing algorithm, a tone reservation algorithm and a cancellation carrier algorithm.

According to an embodiment herein, the plurality of modulated symbols on each subcarrier includes at least one consecutive block.

According to an embodiment herein, transmitting the plurality of signals includes transforming the plurality of modulated symbols from a frequency domain to a time domain.

According to an embodiment herein, a system is provided for reducing Out of Band (OOB) Radiation in Orthogonal Frequency Division Multiplexing (OFDM). The system includes a transmitter to transmit one or more signals with a plurality of modulated symbols on each subcarrier.

According to an embodiment herein, the system includes a digital filter adapted to introduce a controlled amount of correlation among the plurality of modulated symbols on each subcarrier across time.

According to one embodiment herein, the system includes a receiver with a Maximum Likelihood Sequence Detector (MLSD) for removing the controlled amount of correlation among the plurality of modulated symbols and reducing an out of band radiation in OFDM.

According to one embodiment herein, the transmitter comprises a QAM modulation technique such as Binary Phase Shift Keying (BPSK) modulation.

According to one embodiment herein, the receiver comprises a pre-decoding scheme for decoding the plurality of modulated symbols.

According to one embodiment herein, the transmitter comprises a selecting block for choosing one or more correlation patterns based on a plurality of Out of bandwidth (OOB) levels of the plurality of modulated symbols.

These and other objects and advantages of the embodiments herein will become readily apparent from the following detailed description taken in conjunction with the accompanying drawings.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others, this is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method for reducing Out of Band (OOB) Radiation in Orthogonal Frequency Division Multiplexing (OFDM) systems. The method includes transmitting a plurality of signals with a plurality of modulated symbols on each subcarrier and introducing a controlled amount of correlation among consecutive modulated symbols across time and reducing an out of band radiation in OFDM. Further the method includes removing the controlled amount of correlation among the plurality of modulated symbols. The method also includes detecting the plurality of modulated symbols.

According to an embodiment herein, the step of introducing the controlled amount of correlation includes utilizing a carrier-by-carrier controlled signaling induction technique to control the amount of correlation.

According to an embodiment herein, the controlled amount of correlation is introduced based on one or more correlation patterns.

According to an embodiment herein, the one or more correlation patterns are selected based on a plurality of Out of bandwidth (OOB) levels of the plurality of modulated symbols.

According to an embodiment herein, the one or more correlation patterns are assigned to the plurality of modulated symbols on each subcarrier across time.

According to an embodiment herein, the one or more correlation patterns comprise a proper partial signaling scheme.

According to an embodiment herein, the one or more correlation patterns comprise a plurality of convolution coders.

According to an embodiment herein, the proper partial proper signaling scheme comprises a Doubinary scheme and a class 2 PRS scheme.

According to an embodiment herein, the plurality of convolution coders comprises (1+D, 1-2D+D2) as code.

According to an embodiment herein, the controlled amount of correlation is removed using a viterbi algorithm.

According to an embodiment herein, the reduction of Out of bandwidth (OOB) levels includes a plurality of Out of bandwidth (OOB) suppression algorithms.

According to an embodiment herein, the plurality of Out of bandwidth (OOB) suppression algorithms includes at least one of a time windowing algorithm, a tone reservation algorithm and a cancellation carrier insertion algorithm.

According to an embodiment herein, the plurality of modulated symbols on each subcarrier includes at least one consecutive block.

According to an embodiment herein, the step of transmitting the plurality of signals includes transforming the plurality of modulated symbols from a frequency domain to a time domain.

According to an embodiment herein, a system is provided for reducing Out of Band (OBB) Radiation in Orthogonal Frequency Division Multiplexing (OFDM) systems. The system includes a transmitter to transmit one or more signals with a plurality of modulated symbols on each subcarrier.

According to one embodiment herein, the system includes a digital filter adapted to introduce a controlled amount of correlation among the plurality of modulated symbols on each subcarrier across time and reducing an out of band radiation in OFDM.

According to one embodiment herein, the system includes a receiver with a Maximum Likelihood Sequence Detector (MLSD) for removing the controlled amount of correlation among the plurality of modulated symbols.

According to one embodiment herein, the transmitter comprises a QAM modulation technique such as Binary Phase Shift Keying (BPSK) modulation.

According to one embodiment herein, the receiver comprises a pre-decoding scheme for decoding the plurality of modulated symbols.

According to one embodiment herein, the transmitter comprises a selecting block for choosing one or more correlation patterns based on a plurality of Out of bandwidth (OOB) levels of the plurality of modulated symbols.

Figure 1:
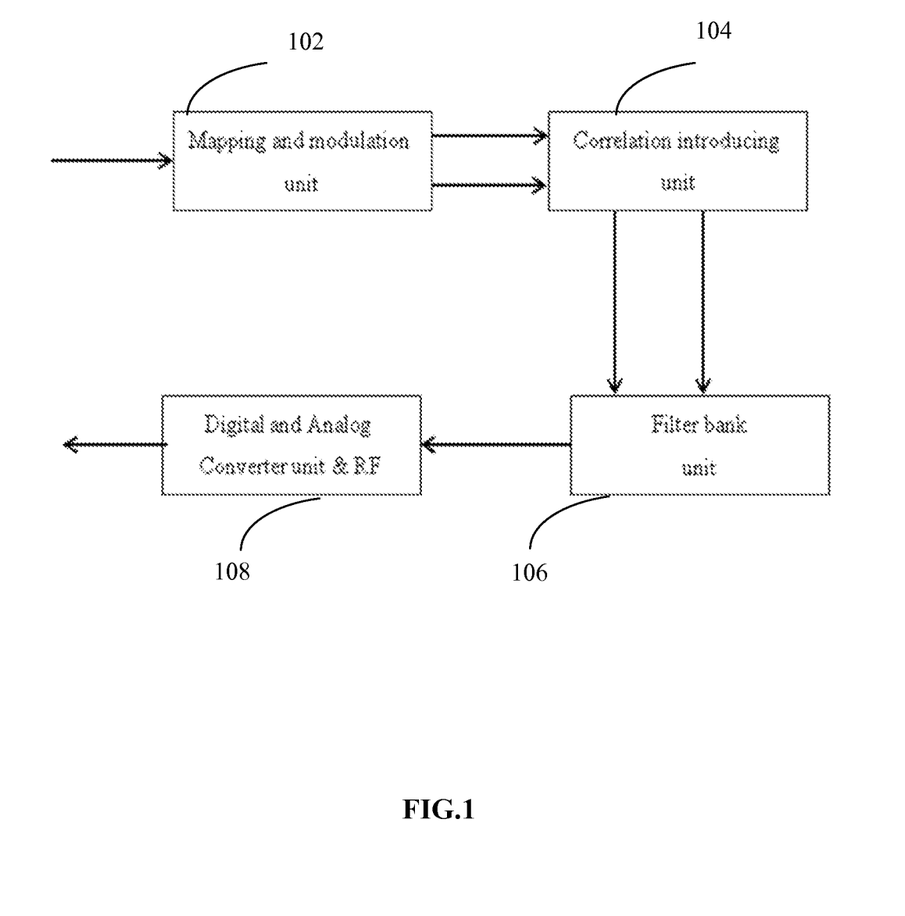
FIG. 1 illustrates a block diagram of a transmitter in OFDM, according to one embodiment herein.

FIG. 1 illustrates a block diagram of a transmitter in OFDM, according to one embodiment, With respect to FIG. 1, the block diagram of the transmitter includes a mapping and a modulation unit 102, a correlation introducing unit 104, an IFFT or filter bank unit 106 and a digital to analog converter unit and Radio Frequency components 108. The modulation unit 102 transmits a plurality of signals with a plurality of modulated symbols on each subcarrier. The sequence data are modulated on various subcarriers in the OFDM transmitter. The correlation introducing unit 104 introduces a controlled amount of correlation among consecutive modulated symbols across time.

After source coding, the data of each subcarrier is given to a block for mapping. The modulation is then performed and a controlled amount of correlation is introduced between the successive symbols of each subcarrier. The IFFT or filter-bank unit 106 transforms the symbols in frequency-domain to time-domain. A digital base-band signal is then fed to the digital to analog (converter) and Radio Frequency components 108 for transmitting to a receiver.

Figure 2:
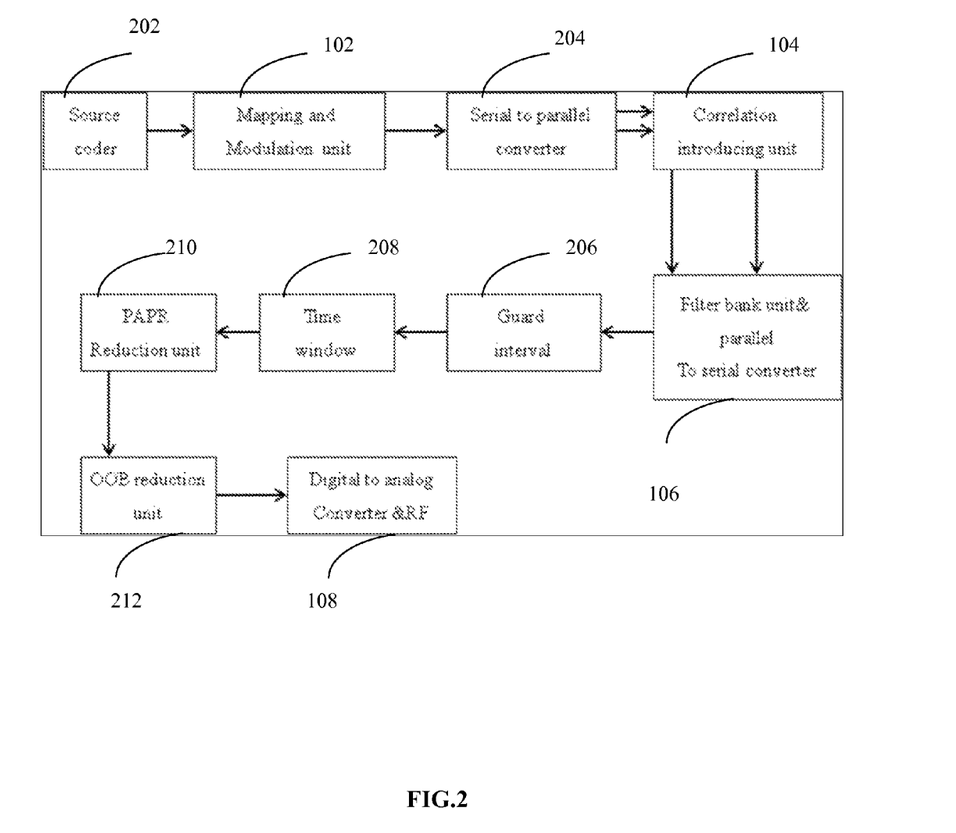
FIG. 2 illustrates a block diagram of a transmitter in OFDM, according to one embodiment herein.

FIG. 2 illustrates a detailed block diagram of a transmitter in OFDM, according to one embodiment. With respect to FIG. 2, the block diagram of the transmitter includes a source coder 202, a modulation and mapping unit 102, a serial to parallel converter 204, a correlation introducing unit 104, an IFFT or filter bank unit 106, a guard interval 206, a time window 208, a PAPR reduction unit 210, an additional Out of band (OOB) radiation reduction unit 212, the digital to analog converter unit and Radio Frequency components 108.

The source coder 202 outputs a data sequence and due to inherent serial characteristics of the data sequence, the serial-to-parallel converter 204 is placed between the modulation unit 102 and the correlation introducing unit 104. The correlation introducing unit 104 introduces a controlled amount of correlation among the consecutive modulated symbols across time. The IFFT or filter-bank unit 106 transforms the symbols in frequency-domain to the symbols in a time-domain.

After performing the IFFT or filter bank operation, the data sequence is sent to the guard interval unit 206 and the time window 208 for further processing. The processed data sequence is then sent to the PAPR reduction unit 210 for decreasing the peak to power average ratio. The data sequence with the reduced PAPR is then sent to the OOB reduction unit 212 for additional removing of the out of band radiation component.

The data sequence is fed to the source coder 202. The serial to parallel converter 204 generates an N parallel streams from a serial one. Further each parallel stream corresponds to at least one subcarrier and the forward error coding and M-array QAM modulation is performed on each subcarrier data. A controlled correlation is introduced between the successive symbols of each subcarrier. Further amplitude of each block is shaped according to the window function and at least one PAPR method is used to reduce the PAPR. The out of band radiation is further reduced and the digital to analog converter generates an analog signal and feds to the radio frequency (RF) unit for transmitting.

The method for reducing Out of Band (OOB) Radiation in Orthogonal Frequency Division Multiplexing (OFDM) includes transmitting a plurality of signals with a plurality of modulated symbols on each subcarrier. The method further includes introducing a controlled amount of correlation among consecutive modulated symbols across time and reducing an out of band radiation in OFDM, removing the controlled amount of correlation among the plurality of modulated symbols. The method also includes detecting the plurality of modulated symbols. A controlled amount of correlation is introduced among modulated symbols on each subcarrier in the consecutive blocks. The effective time duration and bandwidth of transmitted signal will remain unchanged in the method.

Figure 3:
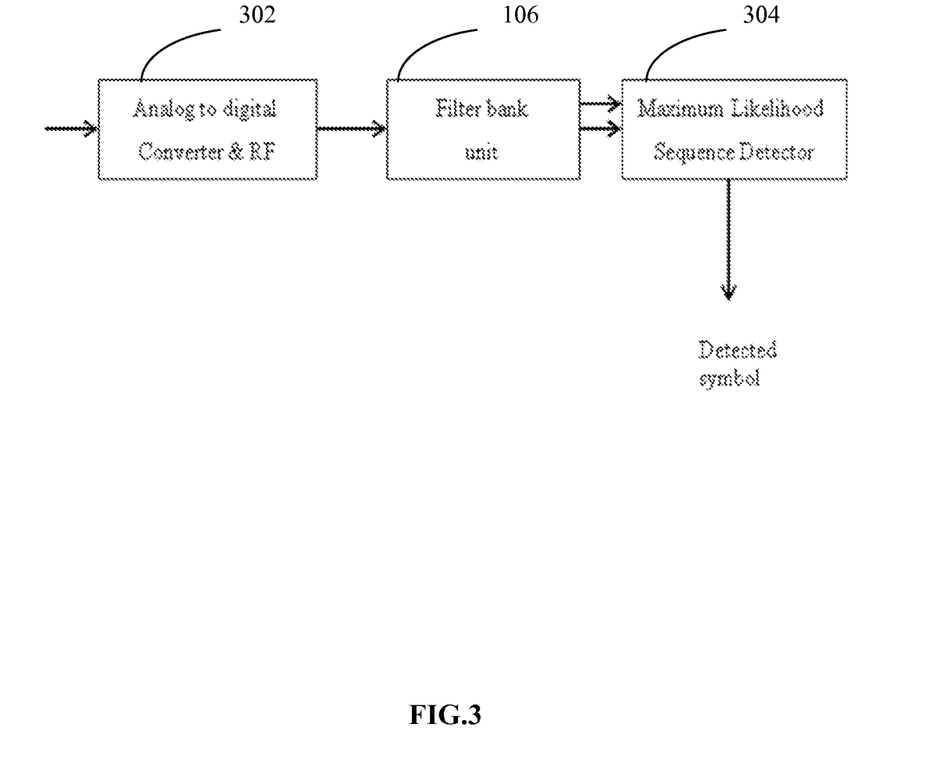
FIG. 3 illustrates a block diagram of a receiver in OFDM, according to one embodiment herein.

FIG. 3 illustrates a block diagram of a receiver in OFDM, according to one embodiment herein. With respect to FIG. 3, the block diagram of the receiver includes an analog to digital converter and radio frequency components 302, an IFFT or filter bank unit 106, and a Maximum Likelihood Sequence Detector (MLSD) 304. The effect of introduced correlation on each subcarrier symbol is removed by a Maximum Likelihood Sequence Detector (MLSD) 304 in the receiver. The controlled amount of correlation is removed using a viterbi algorithm.

The signal received from the transmitter is passed through the RF unit and is fed to the analog to digital converter 302. Further the FFT or Filter-bank unit 106 transforms the signal in time-domain to a frequency domain and M-array QAM demodulation is performed on each subcarrier of the signal. The MLSD detector 304 removes the controlling correlation from symbols of each subcarrier and detection is terminated.

Figure 4:
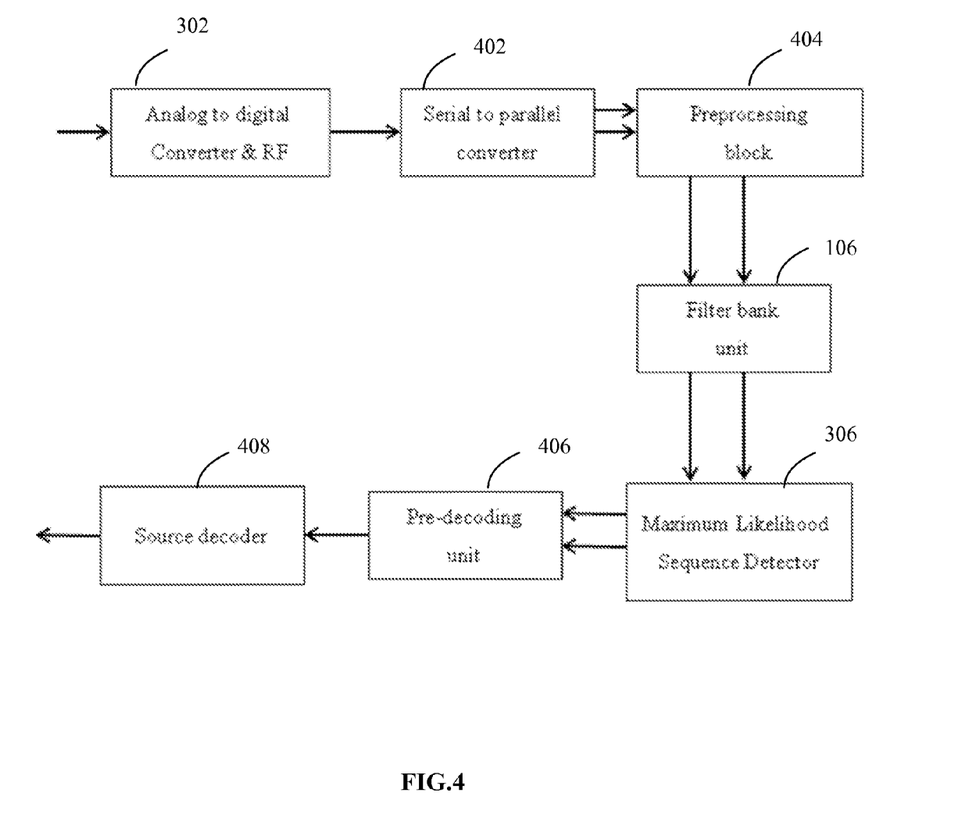
FIG. 4 illustrates a block diagram of a receiver in OFDM, according to one embodiment herein.

FIG. 4 illustrates a block diagram of a receiver in OFDM, according to one embodiment herein. With respect to FIG. 4, the block diagram of the receiver includes an analog to digital converter 302, a serial to parallel converter 402, a preprocessing block 404, an FFT or filter bank unit 106, the MLSD 306, a pre decoding unit 406, and a source decoder 408. The received signal is passed through radio frequency RF unit and is fed to the analog to digital converter 302. The output signal of the analog to digital converter 302 is then sent to the serial to parallel converter 402. The serial to parallel converter 402 generates N parallel streams and each of the streams corresponds to one subcarrier.

The pre-processing block 404 removes the effects of guard interval, windowing, PAPR and the extra OOB reduction. The FFT or filter-bank unit 106 then transforms the signal in time-domain to frequency-domain. Further the MLSD detector 306 removes the controlling correlation and the demodulation process is performed. The pre-decoding unit 406 then performs the process of decoding for each subcarrier and finally the process of source decoding is performed.

Figure 5:
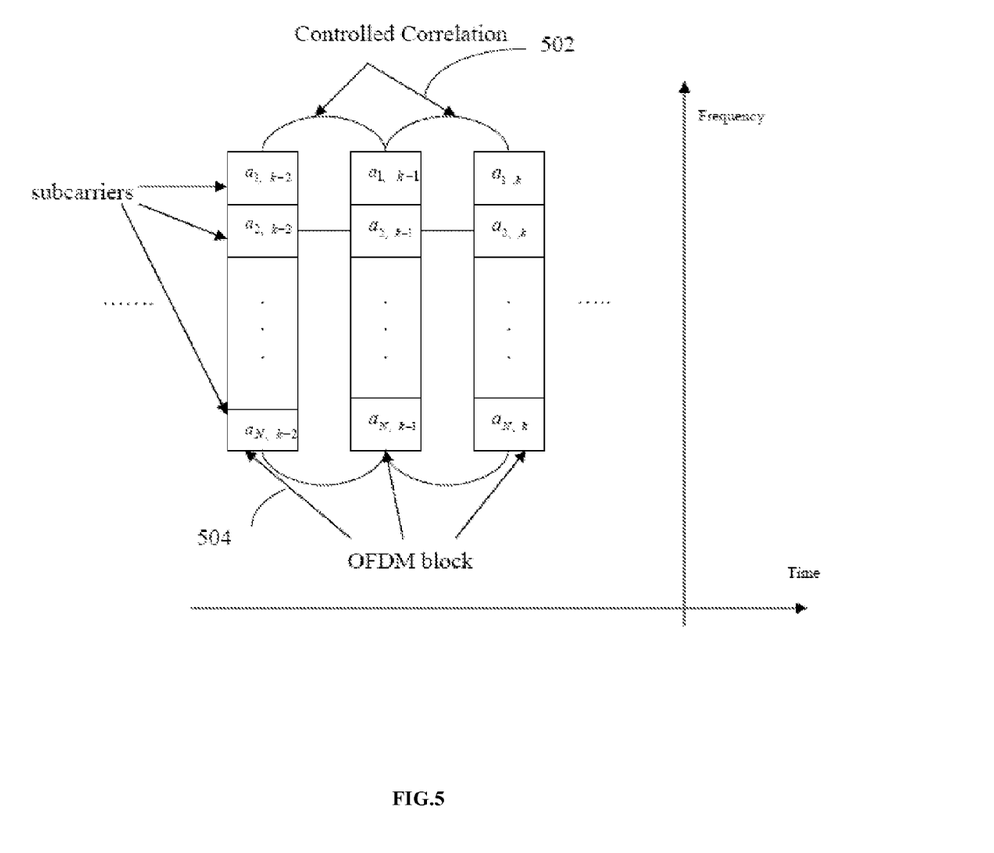
FIG. 5 illustrates a schematic representation of introducing a controlled correlation among successive modulated symbols on each subcarrier by means of digital filters in OFDM, according to one embodiment herein.

FIG. 5 illustrates a schematic representation of correlated successive modulated symbols on each subcarrier across the time, according to one embodiment. With respect to FIG. 5, a controlled amount of correlation 502 is introduced among consecutive modulated symbols across time. Further there is no controlling of correlation between different subcarriers in each OFDM block 504 as shown in FIG. 5.

The coefficients of proper correlation pattern $\{\alpha^1_n\}$, is selected from partial response signaling schemes. The digital filter for l-th subcarrier introduces correlation between L+1 successive symbols using $\{\alpha^1_n\}$. The introduced correlation between symbols is considered for a correct detection of the received signal. Further the reception operation is performed based on a conventional system up to taking FFT or performing filter bank.

Figure 6:
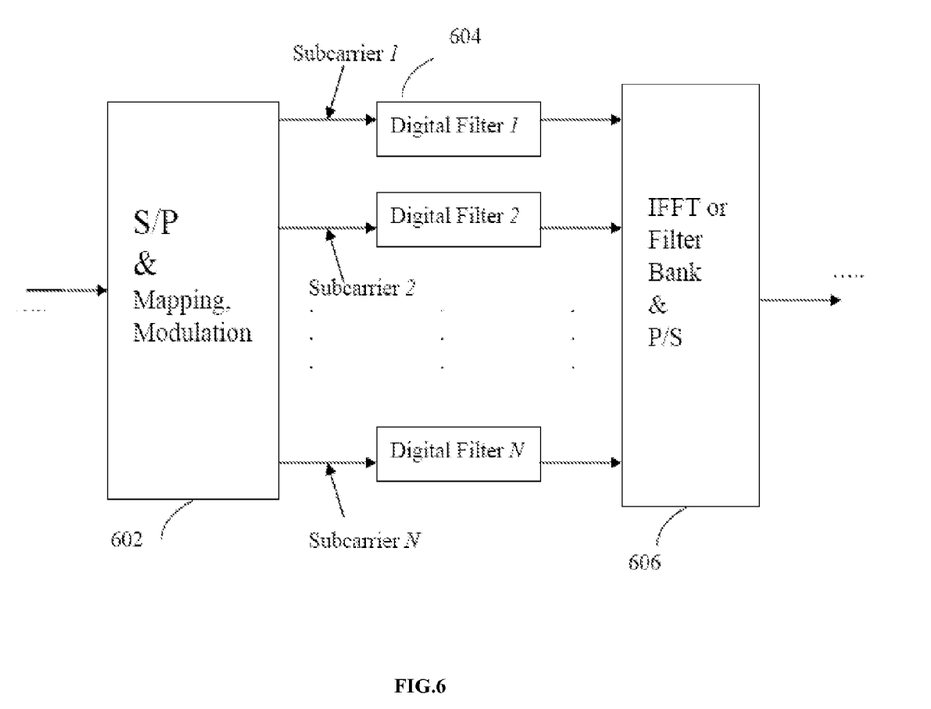
FIG. 6 illustrates a block diagram of systems in OFDM for introducing a controlling correlation between the successive modulated symbols for each subcarrier across the time, according to one embodiment herein.

FIG. 6 illustrates a schematic representation of introducing a controlled correlation among successive modulated symbols on each subcarrier by means of one or more digital filters, according to one embodiment. The FIG. 6 shows the components of block that introduces the correlation. With respect to FIG. 6, the schematic representation includes the serial to parallel converter and the modulation unit in a single block 602, one or more digital filters 604, and an IFFT or filter bank unit and a parallel to serial converter in another block 606. The controlled correlation is introduced after modulation between symbols of each subcarrier. Further, for each subcarrier, the digital filter 604 makes a proper correlation pattern between the modulated symbols across the time.

The coefficients of the l-th filter are $\{\alpha^1_n\}$. Considering an input symbol on l-th subcarrier at time k is $d_{k,l}$. Further a desired correlation pattern is introduced between successive symbols of the subcarrier across the time using the below expression by means of a digital filter:

$$a_{k,l} = \sum_{n=0}^{L} \alpha^l_n \cdot d_{k-n,l}$$

Where $\{\alpha^1_n\}$ are the filter coefficients for l-th subcarrier; and $\{a_{k,l}\}$ are correlation-introduced symbols of l-th subcarrier.

The number of symbols involved in the correlation pattern varies with respect to time. Let us consider that there is correlation between (L+1) successive symbols across the time. Further the correlation is introduced by digital filters and the coefficients of those filters determine the amount of correlation.

The Power Spectral Density (PSD) of the OFDM signal is given by the expression below:

$$X(f) = \sum_{l=1}^{N} B_l(f - l\Delta f)$$

Where, $$B_l(f) = \frac{1}{T_s} |W(f)|^2 \cdot \left| \sum_{n=0}^{L} \alpha^l_n \cdot \exp(-j2\pi f \cdot nT_s) \right|^2$$

W (f) is the Fourier transform of the window function, $T_s$, is the OFDM block duration,
Δf is the subcarrier spacing.

It is clear from the above equation that the correlation pattern, $\{\alpha^1_n\}$, has a significant effect on the PSD. Further a controlling correlation affects the PSD through the following factor listed below:

$$\left|\sum_{n=0}^{L} \alpha_n^l \cdot \exp(-j2\pi[f - l\Delta f] \cdot nT_s)\right|^2$$

Figure 7:
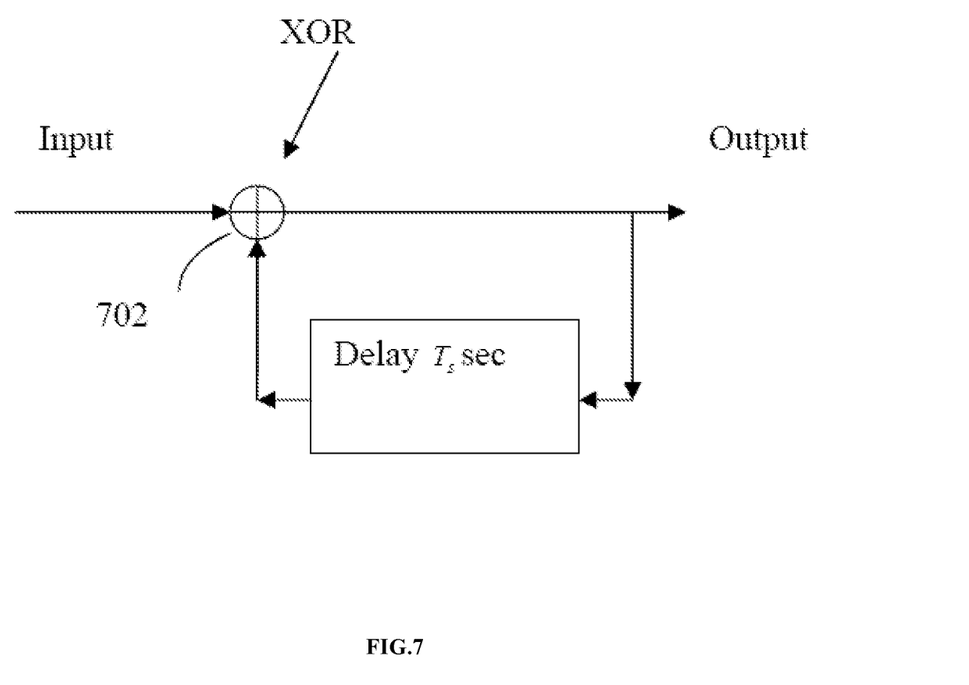
FIG. 7 illustrates a block diagram for pre-coding system for BPSK modulation in OFDM, according to one embodiment herein.

FIG. 7 illustrates a block diagram for pre-coding for BPSK in OFDM, according to one embodiment described herein. The pre-coding is implemented using an XOR gate 702 on binary inputs. Further a delay $T_S$ is the duration of one OFDM block transmitted to the receiver. The controlled amount of correlation is introduced based on one or more correlation patterns.

The one or more correlation patterns are selected based on a plurality of Out of bandwidth (OOB) levels of the plurality of modulated symbols. The one or more correlation patterns are assigned with a lower wavelength to the plurality of modulated symbols on each subcarrier across time. The one or more correlation patterns comprise a proper partial signaling scheme. The proper partial signaling scheme comprises a Doubinary scheme and a class 2 PRS scheme. The plurality of convolution coders comprises (1+D, 1-2D+D2) as code.

The various advantages of the method for reducing Out of Band Radiation (OBR) in Orthogonal Frequency Division Multiplexing (OFDM) are as follows. The method and the system disclosed in the embodiments herein increase the overall performance. Further the method provides a practical feasibility and a flexibility to provide an option for physical layer of Cognitive Radio (CR). This method can also be used in the physical layer of multi-user OFDM systems (OFDMA). The embodiments herein do not restrict the structure of the overall system and several PAPR reduction methods could be used for the reduction of PAPR. Further several methods could be used for more reduction of OOB components.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments, which as a matter of language might be said to fall there between.

What is claimed is:

1. A method for reducing Out of Band (OOB) radiation in Orthogonal Frequency Division Multiplexing (OFDM) system, the method comprises:
   transmitting a plurality of signals with a plurality of modulated symbols on each subcarrier;
   introducing a controlled amount of correlation among the plurality of modulated symbols on each subcarrier across time based on at least one correlation pattern, wherein the at least one correlation pattern comprises a plurality of convolution coders, and wherein the plurality of convolution coders comprises (1+D, 1-2D+D$^2$) as code;
   reducing an out of band radiation in OFDM;
   removing the controlled amount of correlation among the plurality of modulated symbols on each subcarrier; and
   detecting the plurality of modulated symbols,
   wherein the at least one correlation pattern is selected based on a plurality of Out of bandwidth (OOB) levels of the plurality of modulated symbols on each subcarrier.

2. The method according to claim 1, wherein a process of introducing the controlled amount of correlation comprises utilizing a carrier-by-carrier controlled signaling induction technique to control the amount of correlation.

3. The method according to claim 1, further comprises assigning the at least one correlation pattern with a lower wavelength to the plurality of modulated symbols on each subcarrier across time.

4. The method according to claim 1, wherein the at least one correlation pattern comprises a partial signaling scheme.

5. The method according to claim 4, wherein the partial signaling scheme comprises a Doubinary scheme and a class 2 PRS scheme.

6. The method according to claim 1, wherein the controlled amount of correlation is removed using a viterbi algorithm.

7. The method according to claim 1, wherein the Out of bandwidth (OOB) levels are reduced by using a plurality of Out of bandwidth (OOB) suppression algorithms.

8. The method according to claim 7, wherein the plurality of Out of bandwidth (OOB) suppression algorithms include a time windowing algorithm, a tone reservation algorithm and a cancellation carrier insertion algorithm.

9. The method according to claim 1, wherein the plurality of modulated symbols on each subcarrier includes at least one consecutive block.

10. The method according to claim 1, wherein a step of transmitting the plurality of signals comprises transforming the plurality of modulated symbols from a frequency domain to a time domain.

11. A system for reducing Out of Band (OOB) radiation in Orthogonal Frequency Division Multiplexing (OFDM) system, the system comprising:
   a transmitter to transmit one or more signals with a plurality of modulated symbols on each subcarrier;
   a digital filter adapted to introduce a controlled amount of correlation among the plurality of modulated symbols on each subcarrier across time based on at least one correlation pattern, wherein the at least one correlation pattern comprises a plurality of convolution coders, and wherein the plurality of convolution coders comprises (1+D, 1-2D+D$^2$) as code;
   a receiver; and
   a selecting block for choosing the at least one correlation pattern based on a plurality of Out of bandwidth (OOB) levels of the plurality of modulated symbols on each subcarrier, wherein the receiver comprises a Maximum Likelihood Sequence Detector (MLSD) to remove the controlled amount of correlation among the plurality of modulated symbols on each subcarrier to reduce an out of band radiation in OFDM.

12. The system of claim 11, wherein the transmitter comprises a QAM modulation technique such as Binary Phase Shift Keying (BPSK) modulation.

13. The system of claim 11, wherein the receiver comprises a pre-decoding scheme for detecting the plurality of modulated symbols.

* * * * *